United States Patent
Nakayama et al.

(10) Patent No.: US 7,611,212 B2
(45) Date of Patent: Nov. 3, 2009

(54) MOTORCYCLE BRAKING DEVICE AND RELATED CONTROL METHOD

(75) Inventors: Masanobu Nakayama, Saitama (JP); Kazuya Takenouchi, Saitama (JP); Kazuhiko Tani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 624 days.

(21) Appl. No.: 11/296,861

(22) Filed: Dec. 7, 2005

(65) Prior Publication Data

US 2006/0138857 A1 Jun. 29, 2006

(30) Foreign Application Priority Data

Dec. 24, 2004 (JP) .............................. 2004-374104

(51) Int. Cl.
*B60T 13/00* (2006.01)
(52) U.S. Cl. ...................................... 303/9.64; 303/137
(58) Field of Classification Search ................ 303/9.64, 303/3, 113.1, 115.1, 115.2, 137, 139
See application file for complete search history.

(56) References Cited

U.S. PATENT DOCUMENTS

| | | | |
|---|---|---|---|
| 5,209,554 A | 5/1993 | Beilfuss et al. | |
| 5,620,237 A | 4/1997 | Iwashita et al. | |
| 5,967,623 A | 10/1999 | Agnew | |
| 6,409,285 B1 | 6/2002 | Wakabayashi et al. | |
| 2003/0183024 A1 | 10/2003 | Lohberg | |
| 2004/0046444 A1 | 3/2004 | Heubner et al. | |
| 2005/0067892 A9 * | 3/2005 | Heubner et al. | 303/113.5 |
| 2005/0146207 A1 | 7/2005 | Wagner | |

FOREIGN PATENT DOCUMENTS

| | | |
|---|---|---|
| DE | 19510525 | 9/1996 |
| DE | 19841335 | 8/1999 |
| DE | 19920990 | 12/2000 |
| DE | 10324991 | 7/2004 |
| EP | 0518375 | 12/1992 |
| EP | 1176075 | 1/2002 |
| EP | 1277635 | 1/2003 |
| JP | 04-368267 | 12/1992 |
| JP | 2000-264278 (A) | 9/2000 |
| WO | WO 2004/022395 A1 | 3/2004 |

* cited by examiner

*Primary Examiner*—Pam Rodriguez
(74) *Attorney, Agent, or Firm*—Carrier, Blackman & Associates P.C.; William D. Blackman; Joseph P. Carrier

(57) ABSTRACT

A device is provided which improves the brake feeling on a motorcycle which uses a front-rear interlocking brake system. In the motorcycle braking device, which is equipped with an ABS, a brake caliper for a rear wheel works in conjunction with brake operation for a front wheel. When the ABS is active on the side of the front wheel, which is braked by a front wheel brake actuating unit such as a brake lever, the braking pressure ratio between the brake caliper for the front wheel and the brake caliper for the rear wheel is different from that when the ABS is inactive. A process is disclosed for setting an appropriate braking pressure at the rear wheel brake caliper based on a predetermined map of the relationship between the front wheel master cylinder pressure and the rear wheel brake caliper pressure, depending on the control mode.

11 Claims, 5 Drawing Sheets

MOTORCYCLE BRAKING DEVICE AND RELATED CONTROL METHOD

CROSS-REFERENCE TO RELATED APPLICATIONS

The present invention claims priority under 35 USC 119 based on Japanese patent application No. 2004-374104, filed on Dec. 24, 2004. The subject matter of this priority document is incorporated by reference herein.

BACKGROUND OF THE INVENTION

1. Field of the Invention

The present invention relates to a motorcycle braking device.

2. Description of the Background Art

There are known motorcycle braking devices in which the wheel braking member for the rear wheel works in conjunction with a brake operation for the front wheel. For example, when a front wheel brake lever is operated, a braking pressure is applied to a front wheel brake caliper through a master cylinder, and some of the pressure applied to the master cylinder is also applied to a rear wheel brake caliper by a proportioning valve, whereby braking of the rear wheel is accomplished. Such a motorcycle braking device is disclosed, for example, in JP-A No. 368267/1992.

The conventional motorcycle braking devices mentioned above have the following problem: since front and rear braking pressures are uniquely determined by proportioning valve characteristics, if a brake system, for example an Anti Lock Brake System, hereinafter called "ABS", is adopted which controls the slip ratio with respect to the road surface resulting from brake operation, and the ABS for the front wheel is active in brake operation for the front wheel, then the rear wheel side tire's vertical load decreases to a larger extent than on the front wheel side. Thus the perceived brake feeling is degraded.

Therefore, the present invention has as an object to provide a motorcycle braking device which adopts a front-rear interlocking brake system and assures a better perceived brake feeling in the motorcycle.

SUMMARY OF THE INVENTION

In order to solve the above problem, a first aspect of the invention is characterized in that in a motorcycle braking device in which a wheel braking member for a rear wheel (for example, rear wheel brake caliper 4 in an embodiment) works in conjunction with a brake operation for a front wheel, when the braking pressure of a wheel braking member for the front wheel (for example, front wheel brake caliper 4 in the embodiment) interlocked with a front wheel brake actuating unit (for example, front wheel brake actuating unit 2a in the embodiment) is gradually increased, the braking pressure allocated to the wheel braking member for the rear wheel is gradually increased, and then decreased, and finally whether a given braking pressure (for example, braking pressure Pe in the embodiment) is left or not is controlled by electrical switching.

In this configuration, an adequate braking pressure is ensured by the wheel braking member for the rear wheel which works in conjunction with brake operation for the front wheel until brake operation for the front wheel is ended.

A second aspect of the invention is characterized in that in a motorcycle braking device in which a wheel braking member for a rear wheel works in conjunction with a brake operation for a front wheel and the motorcycle braking device is equipped with ABS, when the ABS is active on the side of the front wheel, which is braked by operation of a front wheel brake actuating unit, the braking pressure ratio between the wheel braking member for the front wheel and the wheel braking member for the rear wheel is different from that when the ABS is inactive.

In this configuration, the braking pressure of the wheel braking member for the front wheel and the rear wheel is set to an adequate level when the vertical load of the rear wheel decreases to a larger extent than that of the front wheel.

A third aspect of the invention is characterized in that when the ABS is active on the front wheel side, the braking pressure of the wheel braking member for the rear wheel is higher than when the ABS is inactive.

In this configuration, the braking pressure on the rear wheel side is increased to raise the rear wheel braking pressure.

A fourth aspect of the invention is characterized in that the pressure of the master cylinder, (for example, master cylinder 3 in the embodiment) interlocked with the brake actuating unit, is detected by a sensor (for example, pressure sensor 28 in the embodiment), and a fluid pressure applied to the wheel braking member is electrically adjusted according to the detected pressure.

In this configuration, the fluid pressure can be electrically adjusted freely so that the braking forces on the front and rear wheels can be switched or concurrently applied easily in the ABS or front-rear interlocking brake system.

According to the first aspect of the invention, an adequate braking pressure is ensured by the wheel braking member for the rear wheel which works in conjunction with a brake operation for the front wheel until the brake operation for the front wheel is ended. Therefore, there is an effect that a good perceived brake feeling is assured when the vertical load of the rear wheel tends to decrease to a larger extent.

According to the second aspect of the invention, the braking pressure of the wheel braking member for the front wheel and the rear wheel can be set to an adequate level when the vertical load of the rear wheel decreases to a larger extent than that of the front wheel. Therefore, a good perceived brake feeling is assured.

According to the third aspect of the invention, since the braking pressure on the rear wheel side is increased to raise the rear wheel braking pressure, there is an effect that a good perceived brake feeling is ensured when the rear wheel vertical load tends to decrease to a larger extent.

According to the fourth aspect of the invention, by freely electrically adjusting the fluid pressure, the braking forces on the front and rear wheels can be switched or concurrently applied easily in the ABS or front-rear interlocking brake system.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
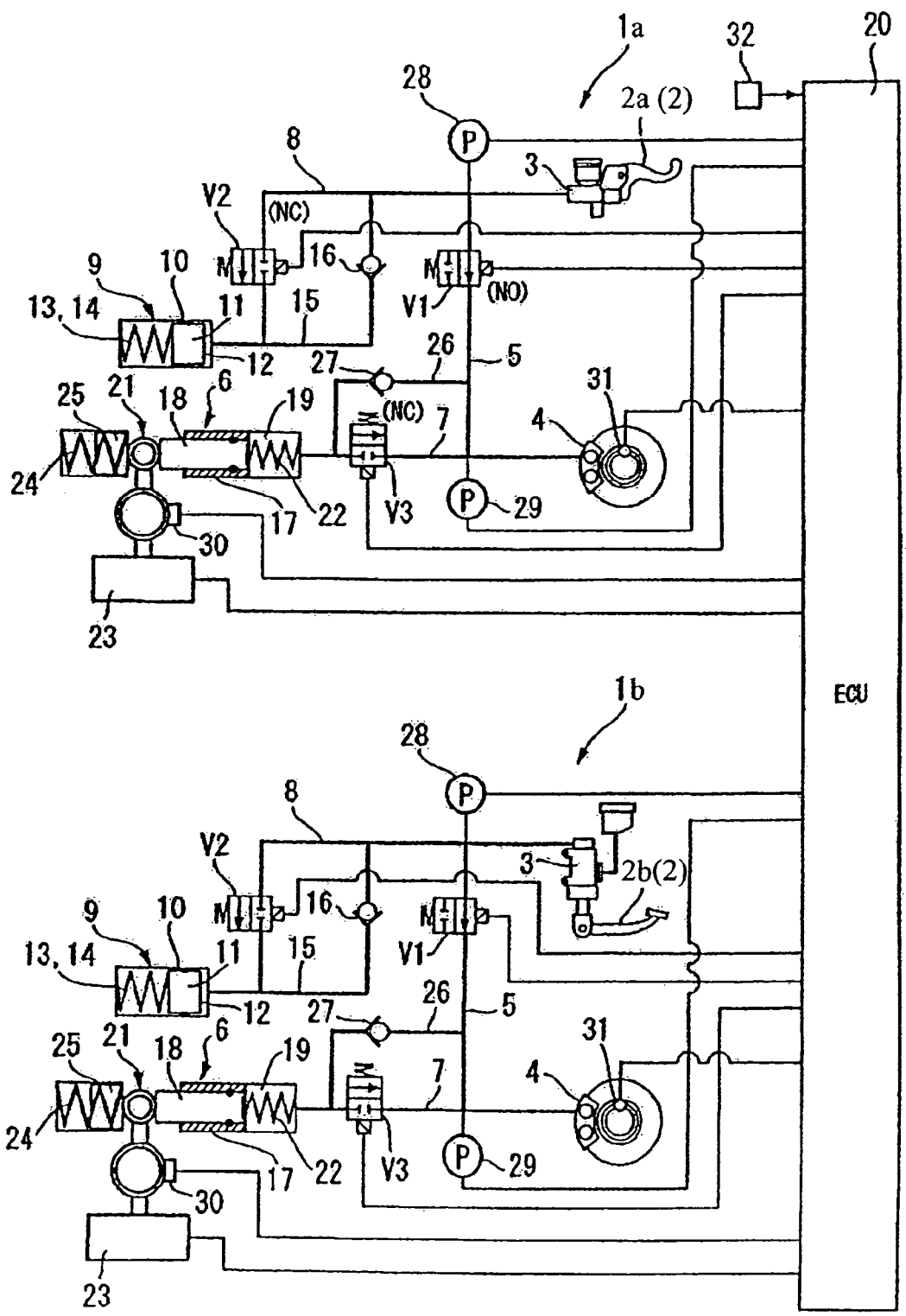
FIG. 1 is a simplified schematic diagram of fluid pressure circuits for a motorcycle braking device according to an illustrative embodiment of the present invention.

FIG. 1 is a simplified hydraulic circuit diagram of a motorcycle braking device according to a selected illustrative embodiment of the present invention. As shown in the figure, the braking device in this embodiment includes a front wheel brake circuit 1a and a rear wheel brake circuit 1b, which are independent from each other, and which are electronically connected via an electronic control unit (ECU) 20.

The front wheel brake circuit 1a and the rear wheel brake circuit 1b are structurally substantially the same except that for brake operation, the front wheel brake circuit 1a relies on a hand-operated brake lever 2a as a brake actuating unit, and the rear wheel brake circuit 1b relies on a brake pedal 2b as a brake actuating unit. The brake lever 2a and the brake pedal 2b function in a substantially similar fashion. Therefore, only the front wheel brake circuit 1a will be described in detail herein. The elements of the rear wheel brake circuit 1b that are the same as those of the front wheel brake circuit 1a are designated by the same reference numerals, and duplicated redundant descriptions are omitted.

The inventive braking device employs an electronic (by-wire) system for both the front and rear wheels, where the extent of operation (fluid pressure in this embodiment) of a brake actuating unit, such as the brake lever 2a, is electrically detected. A fluid pressure, which is produced by a hydraulic modulator according to the detected value, is used to generate a braking force.

This braking device also employs a brake system in which, when either of the front wheel and rear wheels is braked, the front and rear wheel braking members work in conjunction with each other for braking operation. This type of brake system is referred to as a Combined Brake System, hereinafter called "CBS".

Concretely, in the brake circuit in which the brake actuating unit 2 has been operated first, based on the master cylinder fluid pressure, the fluid pressure given by the hydraulic modulator works on the brake caliper in the circuit operated first in accordance with the electronic (by-wire) method. In addition, in the brake circuit operated later, based on the master cylinder pressure in the brake circuit operated first, the fluid pressure given by the hydraulic modulator works on the brake caliper in accordance with the electronic (by-wire) method.

Furthermore, this braking device also employs an anti-lock braking system (ABS).

The brake circuits 1a and 1b each consist of a master cylinder 3, interlocked with the brake actuating unit 2, and a brake caliper 4 matched to the master cylinder 3, which are connected by a main brake passage 5. A hydraulic modulator 6 (explained later) is joined and connected to the main brake passage 5 through a supply-drain passage 7 at a location midway on the main brake passage 5.

A normally-open type (NO) first electromagnetic valve V1, which connects or disconnects the master cylinder 3 and the brake caliper 4, is disposed in the main brake passage 5 at a location between the master cylinder 3 and the brake caliper 4. The supply-drain passage 7 is joined to the main brake passage 5 at a location between the first electromagnetic valve V1 and the brake caliper 4. In addition, a branch passage 8 is connected to the main brake passage at a location between the first electromagnetic valve V1 and the master cylinder 3. The branch passage 8 is connected through a normally-closed type (NC) second electromagnetic valve V2 to a fluid loss simulator 9. The fluid loss simulator 9 applies a virtual hydraulic reaction force to the master cylinder 3 according to the extent of operation of the brake actuating unit 2 when the above first electromagnetic valve V1 closes the main brake passage 5. When a reaction force is applied, this second electromagnetic valve V2 opens the branch circuit 8 to connect the master cylinder 3 and the fluid loss simulator 9.

The fluid loss simulator 9 is structured as follows: a piston 11 is housed in a cylinder 10 in such a way to permit free forward and backward movement. A fluid chamber 12 is disposed between the cylinder 10 and the piston 11, the fluid chamber 12 receiving working fluid flowing from the master cylinder 3. A coil spring 13 and a resin spring 14 are connected in series behind the piston 11. The coil spring 13 and the resin spring 14 are different from each other in spring characteristics. As a result, the, coil spring 13 and resin spring 14 give the piston 11 (and thus the brake actuating unit 2) a reaction force which initially gradually rises, and then sharply rises at a stroke end.

A bypass passage 15 is disposed in the above branch passage 8 which passes around the second electromagnetic valve V2. In this bypass passage 15, there is a return check valve 16 which permits flow of working fluid from the fluid loss simulator 9 toward the master cylinder 3.

The hydraulic modulator 6 includes: a cam mechanism 21 which urges a piston 18 in a cylinder 17 toward a hydraulic chamber 19 formed between the cylinder 17 and the piston 18. The hydraulic modulator 6 includes a return spring 22 which constantly presses the piston 18 against the cam mechanism 21, and an electric motor 23 which drives the cam mechanism 21. The hydraulic chamber 19 is connected to the above supply-drain passage 7. By urging the piston 18 forward with respect to an initial position of the cylinder 17 by means of the cam mechanism 21, or moving the piston 18 back by means of the return spring 22, the hydraulic modulator 6 increases or decreases the pressure in the hydraulic chamber 19, and thereby increases or decreases the braking pressure of the brake caliper 4.

By adjusting the electric current value determined by an input duty ratio (ON time/ON time+OFF time) through pulse width modulation (PWM) control of the electric motor 23, the position of the piston 18, which depends on the rotational position of the cam mechanism 21, is electrically adjusted accurately and easily to adjust the pressure in the hydraulic chamber 19.

In the above cam mechanism 21, a lifter 25, whose stroke is limited by a stopper (not shown) through a backup spring 24, is disposed in such a way as to move forward and backward freely. The piston 18 is constantly pressed by the lifter 25 toward the direction in which the hydraulic chamber 19 is reduced. Consequently, when the electric motor 23 is turned off, the lifter 25 is pressed by the backup spring 24 and stopped by the stopper so that the piston 18 returns to the initial position.

Thus, in the braking device, it is possible to perform both CBS control, which actively supplies working fluid to the main brake passage 5 (brake caliper 4), and ABS control, which moves the piston 18 forward and backward to decrease, hold or again increase the pressure in the hydraulic chamber 19.

A third normally-closed type (NC) valve V3 is inserted in the supply-drain passage 7. The supply-drain passage 7 includes a bypass passage 26 which passes around the third electromagnetic valve V3. In this bypass passage 26, there is a return check valve 27 which permits flow of working fluid from the hydraulic modulator 6 toward the brake caliper 4.

In the front wheel brake circuit 1a and the rear wheel brake circuit 1b, on the input side, or in the portion of the brake circuit which extends from the first electromagnetic valve V1 to the master cylinder 3, there is a pressure sensor (P) 28. Likewise, on the output side, or in the portion of the brake circuit which extends from the first electromagnetic valve V1 to the brake caliper 4, there is a pressure sensor (P) 29. The cam shaft (not shown) of the cam mechanism 21 has an angle sensor 30 for angle information feedback, and the brake caliper 4 has a wheel speed sensor 31 for detecting the wheel speed. Also, a mode select switch 32 is provided to enable the rider to manually select the control mode. If the rider desires CBS control, he/she uses the mode select switch 32 to select the CBS control mode. The following explanation is based on the assumption that CBS control is selected.

The ECU 20 opens or closes each of the first electromagnetic valve V1, second electromagnetic valve V2, and third electromagnetic valve V3 according to detection signals from the pressure sensors 28 and 29, a detection signal from the angle sensor 30 and a detection signal from the wheel speed sensor 31, and controls operation of the electric motor 23.

Concretely, when one brake actuating unit 2 is operated, the speed of the front/rear wheel is inputted from the wheel speed sensor 31 to the ECU 20, and information on the amount of brake operation, etc. is inputted through the pressure sensor 28 to the ECU 20. According to an instruction from the ECU 20, the first electromagnetic valves V1 in both the brake circuits are held so as to close the main brake passages 5, and at the same time, the electromagnetic valves V2 and V3 are held open. As a result, both the hydraulic modulators 6 supply a fluid pressure depending on the vehicle driving condition and brake operation, to the respective brake calipers 4.

The ECU 20 sets as an estimated vehicle speed whichever is higher between the wheel speed detected by the front wheel speed sensor 31 and that by the rear wheel speed sensor 31. The front wheel's slip ratio or the rear wheel's slip ratio is calculated according to the difference between the estimated vehicle speed and the respective front or rear wheel speed. If the front wheel's slip ratio or rear wheel's slip ratio exceeds a predetermined slip ratio threshold, it is decided that a wheel slip has occurred and ABS control begins to reduce the fluid pressure of the hydraulic modulator 6.

In the above configuration, when the vehicle is at a stop (vehicle speed=0), as shown in FIG. 1, in the front wheel brake circuit 1a and rear wheel brake circuit 1b, the first electromagnetic valve V1 is open, the second electromagnetic valve V2 is closed and the third electromagnetic valve V3 is closed. Therefore, the electromagnetic valves V1, V2, and V3 do not require any electric power.

Figure 2:
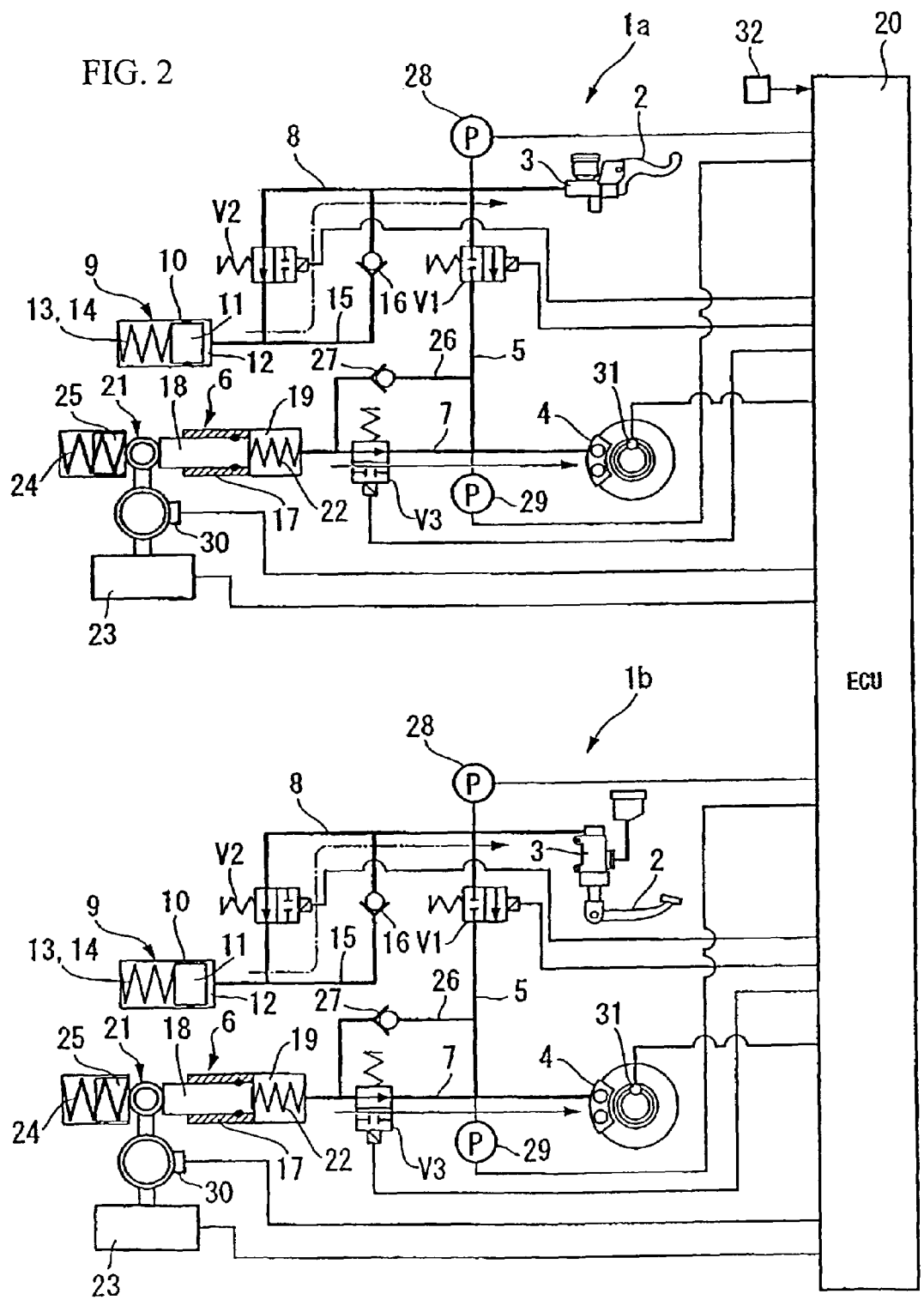
FIG. 2 is a diagram of the fluid pressure circuits of FIG. 1, where braking is under way and the ABS is active for the front wheel.

Then, when the rider operates the brake lever 2a as the brake unit 2 for the front wheel, as shown in FIG. 2, in the front wheel brake circuit 1a, the first electromagnetic valve V1 closes and the second electromagnetic valve V2 and third electromagnetic valve V3 open. Therefore, the main brake passage 5 is disconnected from the master cylinder 3 by closing of the first electromagnetic valve V1 and at the same time the master cylinder 3 and the fluid loss simulator 9 are connected through the branch passage 8 and the main brake passage 5 by opening of the second electromagnetic valve V2, and the fluid loss modulator 6 and the brake caliper 4 are connected through the supply-drain passage 7 and the main brake passage 5 by opening of the third electromagnetic valve V3.

On the other hand, at the same time in the rear wheel brake circuit 1b as well, the first electromagnetic valve V1 closes and the second electromagnetic valve V2 and third electromagnetic valve V3 open. Therefore, the main brake passage 5 is disconnected from the master cylinder 3 by closing of the first electromagnetic valve V1 and at the same time the master cylinder 3 and the fluid loss simulator 9 are connected through the branch passage 8 and the main brake passage 5 by opening of the second electromagnetic valve V2, and the fluid loss modulator 6 and the brake caliper 4 are connected through the supply-drain passage 7 and the main brake passage 5 by opening of the third electromagnetic valve V3.

This gives the rider perceived brake feelings on the front and rear wheel sides which are separately and independently (virtually) reproduced by the fluid loss simulators 9 in the front and rear wheel brake circuits 1a and 1b (see the chain line arrow in FIG. 2). At the same time, a change in fluid pressure due to operation of the hydraulic modulator 6 in each circuit is not transmitted to the rider because the first electromagnetic valve V1 is closed. In parallel with this, the electric motor 23 for the hydraulic modulator 6 starts running and the cam mechanism 21 presses the piston 18 to pressurize the working fluid in the hydraulic chamber 19. As a consequence, the fluid pressure, depending on control of the electric motor 23, is supplied through the main brake passage 5 to the brake caliper 4 (see the solid line arrow in FIG. 2).

If the wheel speed sensor 31 detects that the slip ratio of the front wheel or rear wheel exceeds a prescribed value, the controller 20 controls the electric motor 23 to move the piston 18 back to reduce the braking pressure of the brake caliper 4 and control the slip ratio of the wheel properly by ABS control (CBS control+ABS control). At this time, the first electromagnetic valve V1 is closed and the master cylinder 3 and the hydraulic modulator 6 are disconnected so that pressure change by ABS control is not transmitted to the rider's brake controller 2.

The above explanation assumes a situation in which the brake actuating unit 2 is operated but the ABS is inactive and the vehicle stops. However, even when the ABS is active and the vehicle stops, control is done in the same manner. In other words, when the ABS is active, it decreases, holds and again increases the pressure in the hydraulic chamber 19, and the determination of which is larger between the pressure of the master cylinder 3 and the pressure of the brake caliper 4 cannot be identified according to point at which the vehicle has stopped. Therefore, by adjusting the current value determined by an input duty ratio, through PWM control of the electric motor 23 including its normal and reverse rotation, the position of the piston 18, which is determined by the rotational position of the cam mechanism 21, is electrically adjusted accurately, easily and freely, whether the adjustment is made to increase or decrease the pressure.

The fluid pressure ratio of the front wheel brake caliper 4 to the rear wheel brake caliper 4 is predetermined and this ratio differs depending on whether the ABS is active or inactive.

Figure 3:
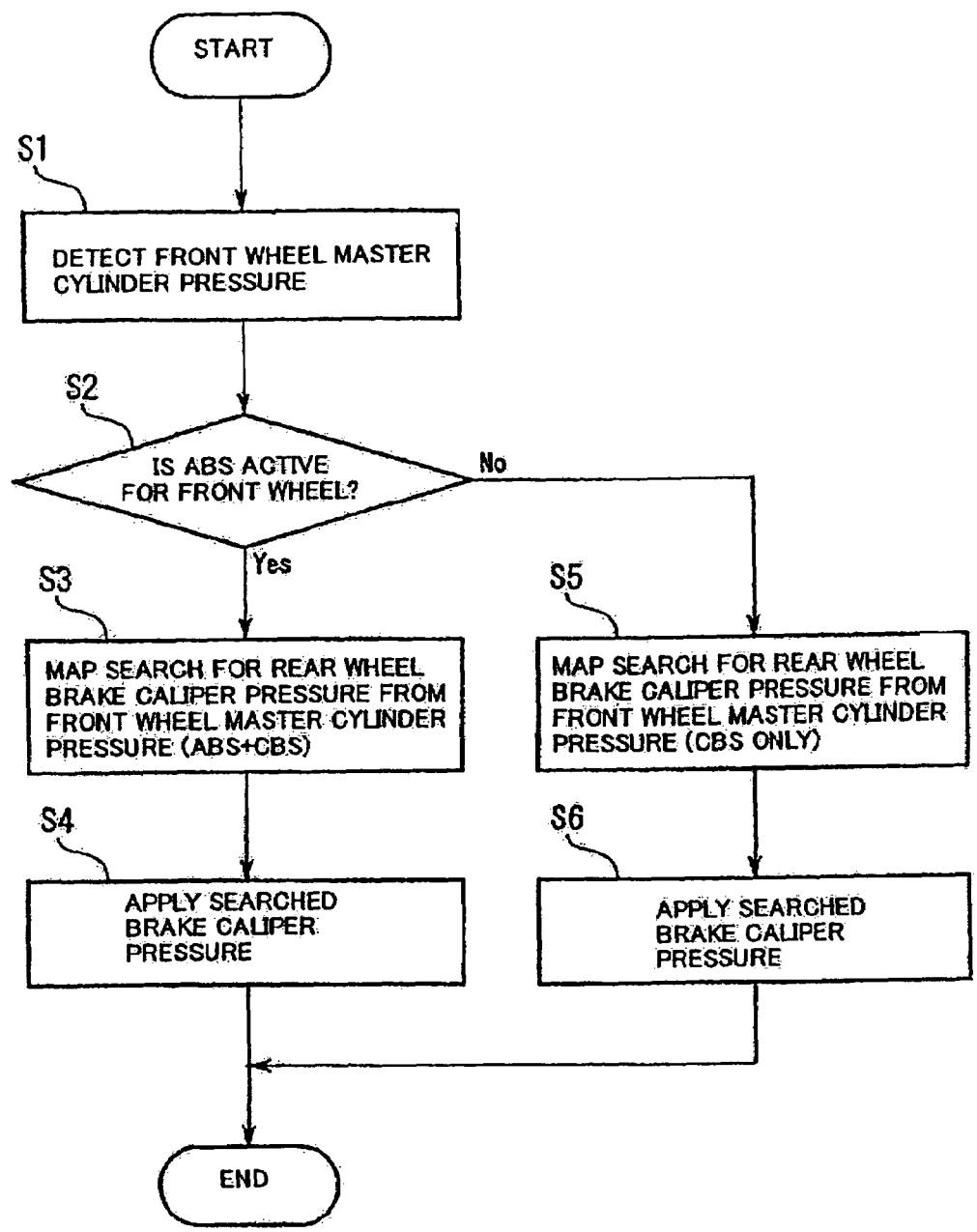
FIG. 3 is a flowchart illustrating the process for determining the braking pressure ratio based on the braking system control mode.

The flowchart in FIG. 3 shows a process that in braking the front wheel, the braking pressure ratio of the rear wheel against the front wheel is changed depending on whether ABS control is done on the front wheel side or not. Specifically, the process disclosed in FIG. 3 controls whether a given braking pressure should be left on the rear wheel or not.

First, at step S1, the pressure in the front wheel master cylinder 3 is detected by the pressure sensor 28. The reason that the pressure in the front wheel master cylinder 3 is used as a reference pressure in this way is that the rider's intention to brake the vehicle should be accurately reflected, though eventually the fluid pressure in the master cylinder 3 is almost equal to the braking pressure of the front wheel brake caliper 4.

Figure 4:
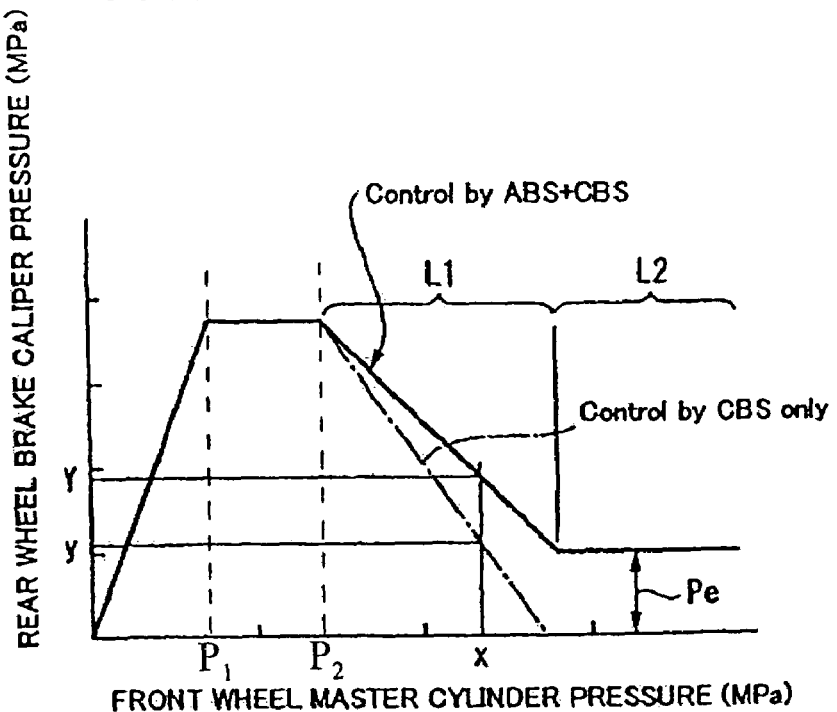
FIG. 4 is a graph which shows the relation between the front wheel master cylinder pressure and the rear wheel brake caliper pressure, in which the solid line represents a situation that ABS control and CBS control are under way and the chain line shows a situation that only CBS control is under way (the ABS is inactive).

FIG. 4 shows change in the rear wheel brake caliper pressure (MPa) (vertical axis) determined depending on the front wheel master cylinder pressure (MPa) (horizontal axis) under CBS control. Here, the solid line represents a situation that ABS control and CBS control are under way and the chain line shows a situation that only CBS control is under way (the ABS is inactive).

As shown in the figure, when the front wheel master cylinder pressure is gradually increased, at first the rear wheel brake caliper pressure gradually increases until it reaches a first front wheel master cylinder pressure $P_1$. As the front wheel master cylinder pressure continues to gradually increase beyond pressure $P_1$, the rear wheel brake caliper pressure levels off. When the front wheel master cylinder pressure is further increased beyond a second front wheel master cylinder pressure $P_2$, the rear wheel brake caliper pressure gradually decreases, where the braking pressure ratio of the rear wheel brake caliper 4 to the front wheel master cylinder pressure under both ABS control and CBS control is different from that under CBS control only (the ABS is inactive).

In other words, in the zone of gradual decrease L1, when the ABS is active as indicated by the solid line in FIG. 4, the ratio is set at Y/x (x: front wheel master cylinder pressure, Y: rear wheel brake caliper pressure). In addition, when the ABS is inactive as indicated by the chain line in FIG. 4, the ratio is set at y/x (x: front wheel master cylinder pressure, y: rear wheel brake caliper pressure). The ratio Y/x (the ABS is active) is larger than the ratio y/x (the ABS is inactive). Furthermore, in zone L2, while the rear wheel brake caliper pressure is eventually set at zero when the ABS is inactive, there still remains a given braking pressure Pe when the ABS is active.

At step S2 in FIG. 3, whether the ABS is currently active on the front wheel side or not is decided. If it is decided at step S2 that the ABS is active, at step S3 the rear wheel brake caliper pressure corresponding to the front wheel master cylinder is determined based on the pre-stored relationship as represented in the graph of FIG. 4. In particular, the solid line in the table of FIG. 4, indicating the ratio when the ABS is active, is used to determine the rear wheel brake caliper pressure. At step S4, this brake caliper pressure is applied to the rear wheel brake caliper 4 through the hydraulic modulator 6 to end control. In applying the fluid pressure through the hydraulic modulator 6, the position of the piston 18 is controlled according to feedback from the pressure sensor 29.

On the other hand, if it is decided at step S2 that the ABS is inactive, at step S5 the rear wheel brake caliper pressure corresponding to the front wheel master cylinder is determined based on the pre-stored relationship as represented in the graph of FIG. 4. In particular the chain line in the table of FIG. 4, indicating the ratio when the ABS is inactive, is used to determine the rear wheel brake caliper pressure. At step S6, this brake caliper pressure is applied to the rear wheel brake caliper 4 through the hydraulic modulator 6 to end control.

Therefore, according to this embodiment, when a braking pressure is applied to the rear wheel brake caliper 4 in conjunction with operation of the front wheel brake actuating unit 2, if the slip ratio of the front wheel exceeds a prescribed value, ABS control starts. As ABS control starts in this way, the vertical load of the rear wheel, which becomes higher in speed than the front wheel, tends to decrease to a larger extent. In this case, a brake caliper pressure is applied to the rear wheel at a larger ratio (Y/x (>y/x)) than the ratio (y/x) when ABS control is not done, and even in the period when braking is ended on the front wheel side, a given braking pressure Pe is left on the rear wheel brake caliper 4 and maintained, and a rear wheel braking pressure is thus ensured. As a consequence, when the vertical load of the rear wheel tends to decrease to a larger extent, the perceived brake feeling is good.

Figure 6:
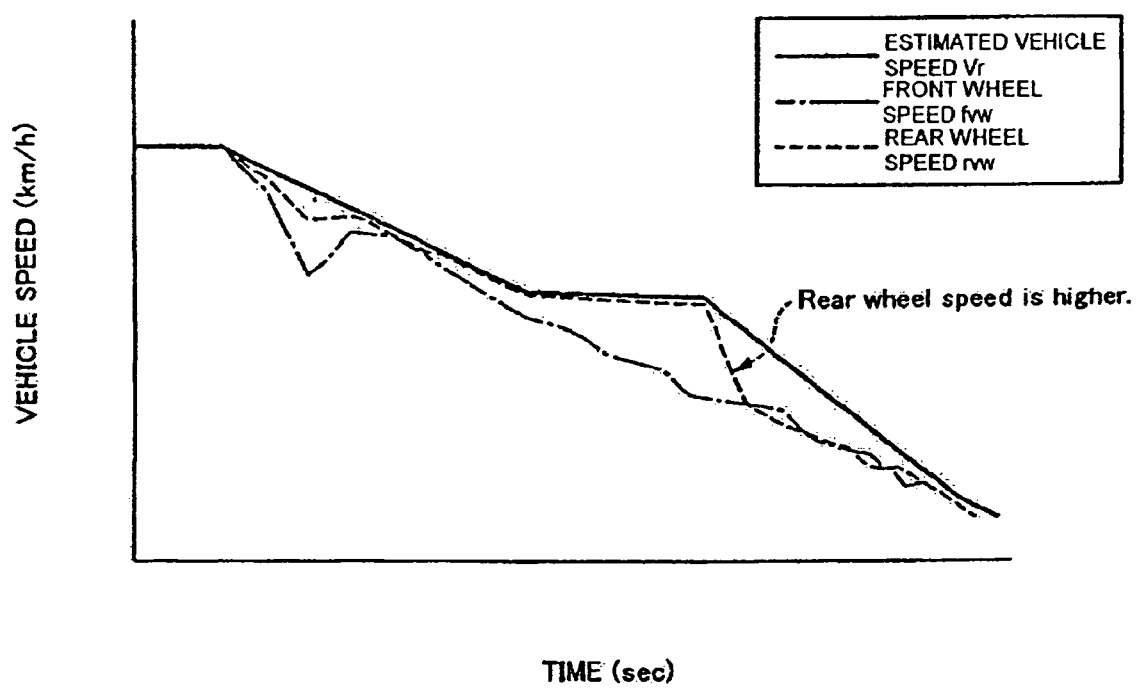
FIG. 6 is a graph which shows change over time in the estimated vehicle speed, the front wheel speed, and the rear wheel speed when the ratio of the rear wheel brake caliper pressure to the front wheel master cylinder pressure is not changed under ABS control.

In other words, under ABS control, when the braking pressure ratio of the rear wheel brake caliper 4 to the front wheel master cylinder pressure is set at the same level as when the ABS is inactive, as shown in FIG. 6, the rear wheel speed (rvw) is higher than the front wheel speed (fvw) and the rear wheel vertical load tends to decrease to a larger extent. Consequently, only the front wheel must bear a large braking load, and consequently, the estimated vehicle speed (Vr) hardly goes down along with the rear wheel speed (rvw) and the perceived brake feeling worsens.

Figure 5:
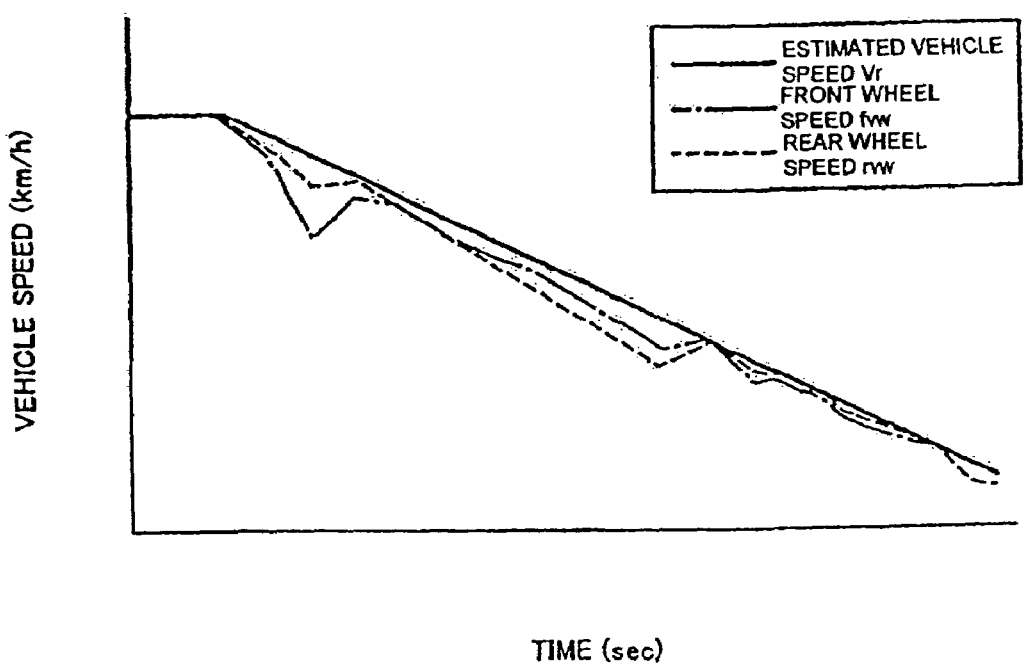
FIG. 5 is a graph which shows change over time in the estimated vehicle speed, the front wheel speed, and the rear wheel speed when the ratio of the rear wheel brake caliper pressure to the front wheel master cylinder pressure is changed under ABS control.

On the other hand, as shown in FIG. 5, when the braking pressure ratio of the rear wheel is set at the level as mentioned above for a situation in which the ABS is active as in this embodiment, the estimated vehicle speed (Vr) goes down and a good perceived brake feeling (for example, as in the embodiment) is obtained and also the rear wheel speed (rvw) and the front wheel speed (fvw) smoothly go down following the estimated vehicle speed (Vr). FIG. 5 and FIG. 6 show how the estimated vehicle speed Vr (solid line), front wheel speed fvw (chain line) and rear wheel speed rvw (broken line) change where the horizontal axis represents time (sec) and the vertical axis represents vehicle speed (km/h).

As explained above, by controlling the braking pressure ratio of the rear wheel brake caliper 4 to the front wheel master cylinder pressure based on the map of FIG. 4, a good perceived brake feeling which corresponds to the rider's brake operation is obtained under ABS control when the rear wheel vertical load tends to decrease to a larger extent.

While a working example of the present invention has been described above, the present invention is not limited to the working example described above, but various design alterations may be carried out without departing from the present invention as set forth in the claims.

What is claimed is:

1. A motorcycle braking device, the motorcycle braking device comprising
    a front wheel brake actuating unit,
    a front wheel braking member operatively interconnected with the front wheel brake actuating unit,
    an electronic control unit,
    a rear wheel braking member which continuously works in conjunction with a braking operation of the front wheel during operation of the motorcycle according to direction from the electronic control unit,
    wherein front and rear brake braking operation is controlled by the electronic control unit such that when the braking pressure of the front wheel braking member is gradually increased, the braking pressure allocated to the rear wheel braking member is gradually increased, then decreased, and then a final braking pressure is determined to be either zero or a predetermined braking pressure according to a predetermined map.

2. The motorcycle braking device as described in claim 1, wherein the braking device further comprises a master cylinder interlocked with the brake actuating unit and a sensor, and wherein the pressure of the master cylinder is detected by the sensor, and a fluid pressure applied to the rear wheel braking member is electrically adjusted according to the detected pressure.

3. A motorcycle braking device, the motorcycle braking device comprising
    a brake circuit,
    a front wheel brake actuating unit which, when operated, actuates a braking operation of a front wheel,
    a front wheel braking member,
    a rear wheel braking member which works in conjunction with a braking operation for the front wheel, and
    an anti-lock braking system (ABS), wherein when the ABS is active, a ratio of rear wheel braking member pressure to front wheel master cylinder pressure is set at Y/x where x is defined as the sensed front wheel master cylinder pressure, and Y is defined as the sensed rear wheel braking member pressure during an active ABS, and
    when the ABS is inactive the ratio of rear wheel braking member pressure to front wheel master cylinder pressure is set at y/x, where y is defined as the sensed rear wheel braking member pressure during an inactive ABS, wherein the ratio Y/x is larger than the ratio y/x.

4. The motorcycle braking device as described in claim 3, wherein when the ABS is active on a side of the brake circuit corresponding to the front wheel, the braking pressure of the wheel braking member for the rear wheel is higher than when the ABS is inactive.

5. The motorcycle braking device as described in claim 3, wherein the braking device further comprises a master cylinder interlocked with the brake actuating unit and a sensor, and
    wherein the pressure of the master cylinder is detected by the sensor, and a fluid pressure applied to the rear wheel braking member is electrically adjusted according to the detected pressure.

6. A method of controlling a braking device for a motorcycle, the braking device comprising
    a front wheel brake actuating unit,
    a master cylinder,
    a sensor for sensing the master cylinder pressure,
    a front wheel braking member operatively connected with the front wheel brake actuating unit,
    a rear wheel braking member which continuously works in conjunction with a brake operation for the front wheel during operation of the motorcycle,
    the method of controlling the braking device comprising the steps of:
        gradually increasing braking pressure of the rear wheel braking member as a sensed pressure of the master cylinder increases to a first front wheel master cylinder pressure,
        maintaining braking pressure of the rear wheel braking member as the sensed pressure of the master cylinder further increases from the first front wheel master cylinder pressure to a second front wheel master cylinder pressure,
        gradually decreasing the braking pressure of the rear wheel braking member as the sensed pressure of the master cylinder increases from the second front wheel master cylinder pressure, and
        determining a final braking pressure of the rear wheel braking member to be either zero or a predetermined braking pressure greater than zero, based on a control mode of the braking device and a predetermined map.

7. The method of controlling a braking device for a motorcycle of claim 6, wherein the braking device comprises an antilock braking system (ABS), and when the control mode of the braking device comprises an active ABS, the braking pressure ratio between the front wheel braking member and the rear wheel braking member is different from that when the ABS is inactive.

8. The method of controlling a braking device for a motorcycle of claim 6, wherein the braking device comprises an antilock braking system (ABS), and when the control mode of the braking device comprises an active ABS, and when the sensed pressure of the master cylinder increases from the second front wheel master cylinder pressure, the braking pressure of the rear wheel braking member decreases less gradually than when the control mode of the braking device does not comprise an active ABS.

9. The method of controlling a braking device for a motorcycle of claim 6, wherein the braking device comprises an antilock braking system (ABS), and when the control mode of the braking device comprises an active ABS, the final braking pressure of the rear wheel braking member is determined to be the predetermined braking pressure.

10. The method of controlling a braking device for a motorcycle of claim 6, wherein the braking device comprises an antilock braking system (ABS), and a predetermined map of the front wheel master cylinder pressure versus the rear wheel brake caliper pressure for both a first control mode in which ABS is active and a second control mode in which ABS is disabled, the method of controlling the braking device further comprising the following method steps:
determining whether or not the ABS is active,
determining a braking pressure of the rear wheel braking member using the predetermined map.

11. A method of controlling a braking device for a motorcycle, the braking device comprising
a front wheel brake actuating unit,
a master cylinder,
a sensor for sensing the master cylinder pressure,
a front wheel braking member operatively connected with the front wheel brake actuating unit,
a rear wheel braking member which works in conjunction with a brake operation for the front wheel,
the method of controlling the braking device comprising the steps of:
gradually increasing braking pressure of the rear wheel braking member as a sensed pressure of the master cylinder increases to a first front wheel master cylinder pressure,
maintaining braking pressure of the rear wheel braking member as the sensed pressure of the master cylinder further increases from the first front wheel master cylinder pressure to a second front wheel master cylinder pressure,
gradually decreasing the braking pressure of the rear wheel braking member as the sensed
pressure of the master cylinder increases from the second front wheel master cylinder pressure, and
determining a final braking pressure of the rear wheel braking member to be either zero or a predetermined braking pressure greater than zero, based on a control mode of the braking device
wherein the braking device comprises an antilock braking system (ABS) and a sensor for sensing the rear wheel braking member pressure, and
wherein as the sensed pressure of the master cylinder increases from the second front wheel master cylinder pressure, and
when the ABS is active a ratio of rear wheel braking member pressure to front wheel master cylinder pressure is set at Y/x where x is defined as the sensed front wheel master cylinder pressure, and Y is defined as the sensed rear wheel braking member pressure during an active ABS, and
when the ABS is inactive the ratio of rear wheel braking member pressure to front wheel master cylinder pressure is set at y/x, where y is defined as the sensed rear wheel braking member pressure during an inactive ABS,
wherein the ratio Y/x is larger than the ratio y/x.

* * * * *